United States Patent
Griph

[19]

[11] Patent Number: 5,990,703
[45] Date of Patent: Nov. 23, 1999

[54] APPARATUS AND METHOD FOR A LOW POWER LATCHABLE ADDER

[75] Inventor: Richard Steven Griph, Mesa, Ariz.

[73] Assignee: Motorola, Inc., Schaumburg, Ill.

[21] Appl. No.: 08/962,554

[22] Filed: Oct. 31, 1997

[51] Int. Cl.[6] ........................................ G05B 1/00
[52] U.S. Cl. ........................ 326/53; 326/49; 364/712; 364/184.02
[58] Field of Search .................... 364/784, 768, 364/786.03, 786.04, 712, 787.01, 784.02; 326/53, 49

[56] References Cited

U.S. PATENT DOCUMENTS

| | | | |
|---|---|---|---|
| 4,390,962 | 6/1983 | Current | 364/768 |
| 4,916,653 | 4/1990 | Shimizu et al. | 364/784 |

*Primary Examiner*—David Nelms
*Assistant Examiner*—Thong Le
*Attorney, Agent, or Firm*—Gregory J. Gorrie; James E. Klekotka

[57] ABSTRACT

A high speed, low power 3-2 adder (300, 500) with latchable outputs comprises a most significant bit (MSB) adder circuit (100) and a least significant bit (LSB) adder circuit (200). MSB adder circuit (100) includes three differential data inputs (A1, B1, and C1), a latch enable input (LE1), three separate bias points, and an MSB output. In addition the LSB adder circuit includes three differential data inputs (A2, B2, and C2), a latch enable input (LE2), three separate bias points and a LSB output. Internal latch circuits (172, 272) and latch enable circuits (174, 274) are provided in each adder stage. Internal latch enable inputs are connected in parallel in one configuration. Separate latch enable inputs are provide in a second configuration. Separate bias points are also provided in each adder stage.

21 Claims, 5 Drawing Sheets

| 402 | 404 | 406 | 410 | 420 | 422 |
|---|---|---|---|---|---|
| INPUT A | INPUT B | INPUT C | LATCH ENABLE | MSB OUTPUT | LSB OUTPUT |
| X | X | X | 0 | LATCHED | LATCHED |
| 0 | 0 | 0 | 1 | 0 | 0 |
| 0 | 0 | 1 | 1 | 0 | 1 |
| 0 | 1 | 0 | 1 | 0 | 1 |
| 0 | 1 | 1 | 1 | 1 | 0 |
| 1 | 0 | 0 | 1 | 0 | 1 |
| 1 | 0 | 1 | 1 | 1 | 0 |
| 1 | 1 | 0 | 1 | 1 | 0 |
| 1 | 1 | 1 | 1 | 1 | 1 |

FIG. 4    400

| INPUT A | INPUT B | INPUT C | MSB LE | LSB LE | MSB OUTPUT | LSB OUTPUT |
|---|---|---|---|---|---|---|
| X | X | X | 0 | 1 | LATCHED | X |
| X | X | X | 1 | 0 | X | LATCHED |
| 0 | 0 | 0 | 1 | 1 | 0 | 0 |
| 0 | 0 | 1 | 1 | 1 | 0 | 1 |
| 0 | 1 | 0 | 1 | 1 | 0 | 1 |
| 0 | 1 | 1 | 1 | 1 | 1 | 0 |
| 1 | 0 | 0 | 1 | 1 | 0 | 1 |
| 1 | 0 | 1 | 1 | 1 | 1 | 0 |
| 1 | 1 | 0 | 1 | 1 | 1 | 0 |
| 1 | 1 | 1 | 1 | 1 | 1 | 1 |

APPARATUS AND METHOD FOR A LOW POWER LATCHABLE ADDER

FIELD OF THE INVENTION

This invention relates generally to digital gates and, more particularly, to latchable adders.

BACKGROUND OF THE INVENTION

One problem faced in the design of digital integrated circuits for communication equipment is unnecessary transistors and the power and current associated with them. Many digital integrated circuits use adder circuits along with latching circuits.

What is needed is an approach for reducing the transistor count and the power required and increasing the speed of adder circuits.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

FIG. 4 illustrates a truth table representation for the operation of the 3-2 adder in accordance with a preferred embodiment of the present invention;

DETAILED DESCRIPTION OF A PREFERRED EMBODIMENT

The power consumption problem associated with digital adders is significant and has prevented the building of digital subsystems such as equalizers. The present invention provides a novel approach for reducing the transistor count and power required while increasing the speed and controllability of digital adder circuits.

The present invention provides, among other things, a lower power, lower transistor count method of adding binary numbers. The latching and adding operations are combined into a single circuit, and this combination provides power and transistor count reductions. In a preferred embodiment of the present invention, the transistor count has been reduced, and the power has been reduced.

The adder circuit of the present invention can be used to increase the speed of the multiplier and summer circuits required for digital equalizers. The primary tasks performed in a digital equalizer are the multiplication and the addition of many binary values. On closer examination of the multiplication operation, it can be shown that this operation is also primarily an addition operation. This occurs primarily for a parallel implementation of the multiplier where all the shift and add operations normally associated with multipliers occur simultaneously. Therefore, a low power adder circuit is critical to the implementation of a low power equalizer circuit. The summations can be performed using multiple 3-2 adders. These adders use three input bits at the same level, and they produce 1-bit carries to the next bit level and 1-bit remainders at the current bit level.

In a preferred embodiment, an MSB adder and a LSB adder are used in the 3-2 adder circuit. When three binary digits at the same bit levels are added, the resulting sum can be represented using two binary digits. One of the two resulting binary digits is at a bit level one higher than the input bits. The other one of the resulting bits is at the same bit level as the input bits. In this case, the bit at the higher bit level is the MSB result bit, and the other result bit is the LSB bit. In addition, the disclosed circuit is also designed to be put into a latched state to allow its use in a pipelined circuit without the use of external latching registers.

Figure 1:
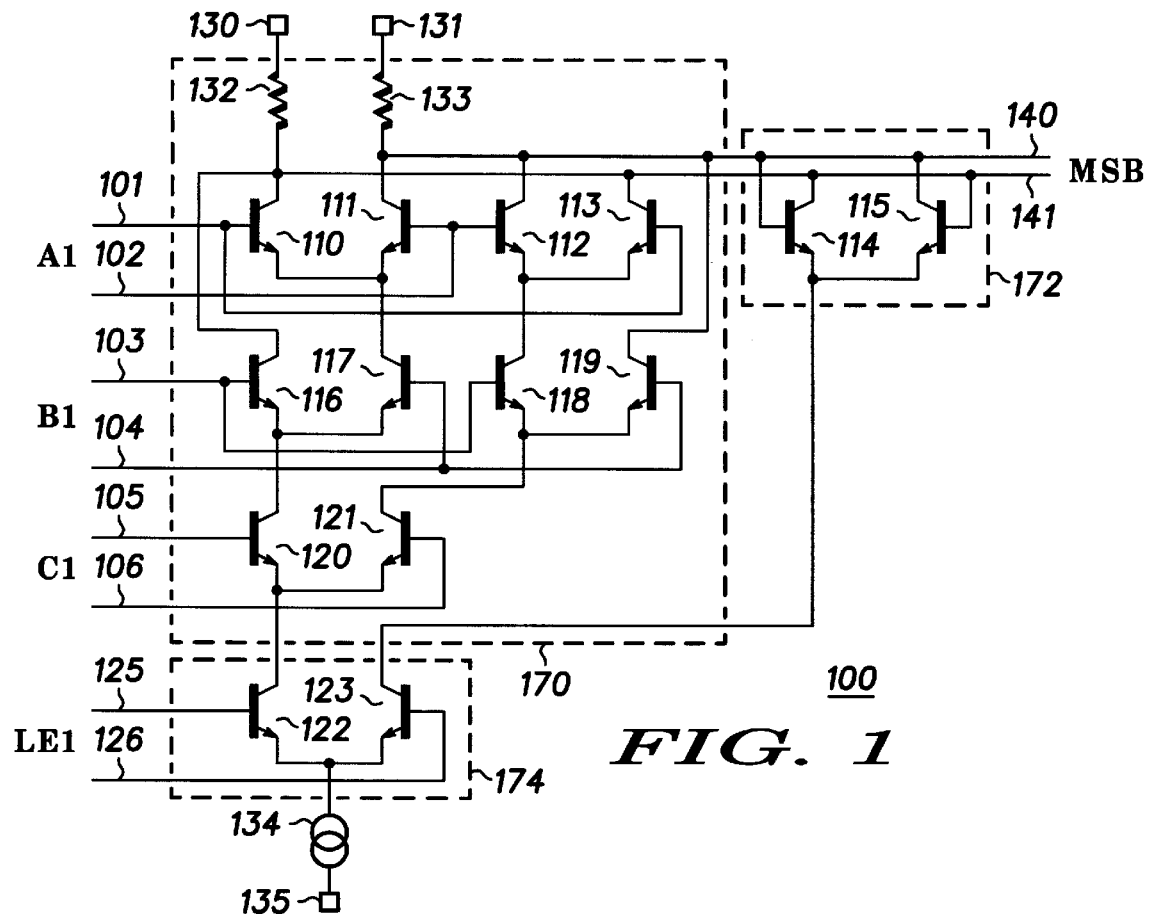
FIG. 1 shows a simplified schematic diagram of a most significant bit (MSB) adder circuit in accordance with a preferred embodiment of the present invention.

FIG. 1 shows a simplified schematic diagram of an MSB adder in accordance with a preferred embodiment of the present invention. MSB adder 100 includes transistors 110, 111, 112, 113, 114, 115, 116, 117, 118, 119, 120, 121, 122, and 123. MSB adder also includes bias points 130, 131, and 135. MSB adder also includes bias resistor 132, bias resistor 133, and current source 134. In addition, MSB adder includes an A1 input with first terminal 101 and second terminal 102, a B1 input with first terminal 103 and second terminal 104, a C1 input with first terminal 105 and second terminal 106, an LE1 input with first terminal 125 and second terminal 126, and an MSB output with first terminal 140 and second terminal 141.

Transistors 110, 111, 112, 113, 116, 117, 118, 119, 120, and 121 form a three level, serial logic adder 170. Transistors 110, 111, 112, and 113 form a first logic level "A" with transistors 110 and 111, and transistors 112 and 113 forming two distinct differential pairs. Transistors 116, 117, 118, and 119 form a second logic level "B" with transistors 116 and 117, and transistors 118 and 119 forming two distinct differential pairs. Transistors 120 and 121 form a third logic level "C" with transistors 120 and 121 forming a differential pair.

Transistors 114 and 115 form latch circuit 172. Transistors 122 and 123 form latch enable circuit 174. Latch enable circuit 174 is used to steer bias current to adder 170 or to latch circuit 172.

Collector terminal of transistor 110, collector terminal of transistor 116, collector terminal of transistor 112, collector terminal of transistor 114, and base terminal of transistor 115 are connected at a first node, and this first node is connected to bias point 130 through resistor 132. This first node is also connected to a first terminal 140 on the MSB output.

Collector terminal of transistor 111, collector terminal of transistor 112, collector terminal of transistor 119, collector terminal of transistor 115, and base terminal of transistor 114 are connected at a second node, and this second node is connected to bias point 131 through resistor 133. This second node is also connected to a second terminal 141 on the MSB output.

Base terminal of transistor 110 and base terminal of transistor 113 are connected to a first terminal 101 on the A1 input. Base terminal of transistor 111 and base terminal of transistor 112 are connected to a second terminal 102 on the A1 input.

Emitter terminal of transistor 110 and emitter terminal of transistor 111 are connected to collector terminal of transistor 117. Emitter terminal of transistor 112 and emitter terminal of transistor 113 are connected to collector terminal of transistor 118.

Base terminal of transistor 116 and base terminal of transistor 118 are connected to a first terminal 103 on the B1 input. Base terminal of transistor 117 and base terminal of transistor 119 are connected to a second terminal 104 on the B1 input.

Emitter terminal of transistor 116 and emitter terminal of transistor 117 are connected to collector terminal of transistor 120. Emitter terminal of transistor 118 and emitter terminal of transistor 119 are connected to collector terminal of transistor 121.

Base terminal of transistor 120 is connected to a first terminal 105 on the C1 input. Base terminal of transistor 121 is to a second terminal 106 on the C1 input.

Emitter terminal of transistor 120 and emitter terminal of transistor 121 are connected to collector terminal of transistor 122. Emitter terminal of transistor 114 and emitter terminal of transistor 115 are connected to collector terminal of transistor 123.

Base terminal of transistor 122 is connected to a first terminal 125 on the LE1 input. Base terminal of transistor 123 is connected to a second terminal 126 on the LE1 input. Emitter terminal of transistor 122 and emitter terminal of transistor 123 are connected to current source 134. Current source 134 is also connected to bias point 135.

In a preferred embodiment, bias point 135 is connected to ground. In addition, bias point 130 and bias point 131 are connect to a positive supply voltage source.

Figures 2, 6:
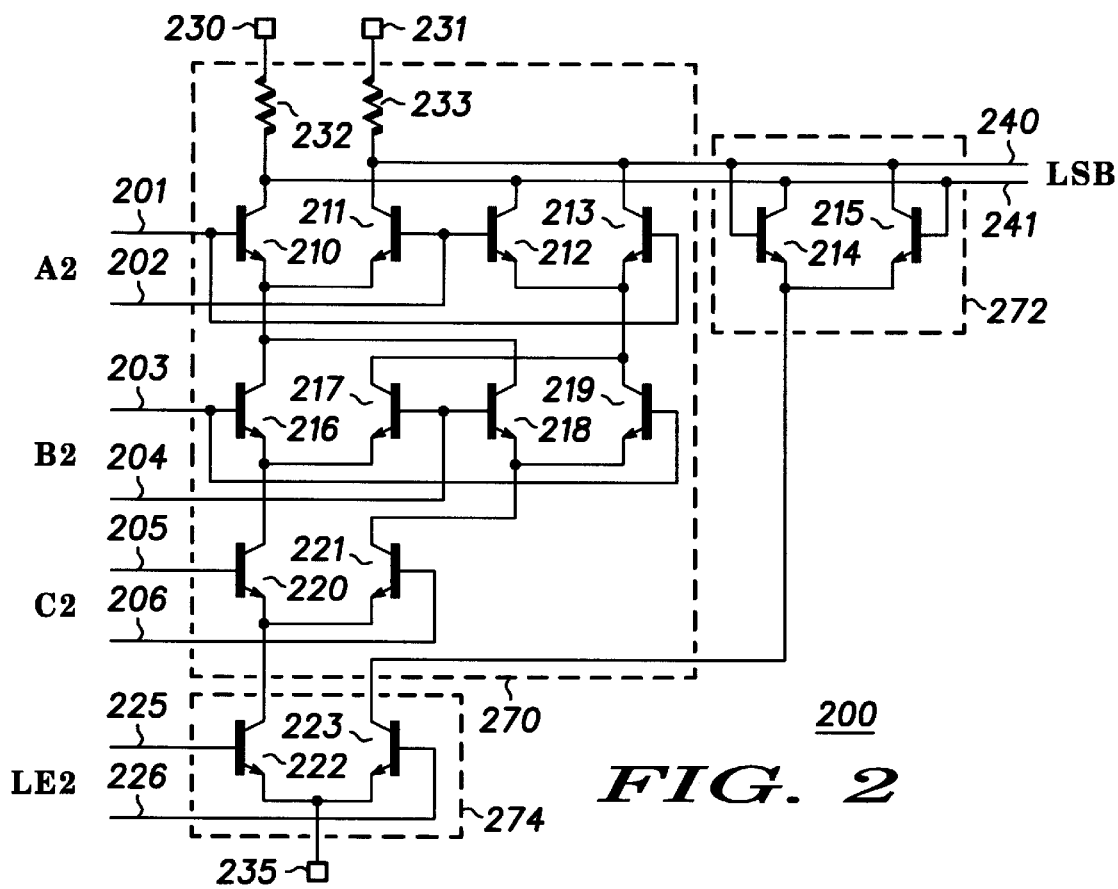
FIG. 2 shows a simplified schematic diagram of a least significant bit (LSB) adder circuit in accordance with a preferred embodiment of the present invention.
FIG. 6 illustrates a truth table representation for the operation of the 3-2 adder circuit in accordance with an alternate embodiment of the present invention.

FIG. 2 shows a simplified schematic diagram of an LSB adder circuit in accordance with a preferred embodiment of the present invention. LSB adder 200 includes transistors 210, 211, 212, 213, 214, 215, 216, 217, 218, 219, 220, 221, 222, and 223. LSB adder also includes bias points 230, 231, and 235. MSB adder also includes bias resistor 232 and bias resistor 233. In an alternate embodiment, a current source may also be included. In addition, LSB adder includes an A2 input with first terminal 201 and second terminal 202, a B2 input with first terminal 203 and second terminal 204, a C2 input with first terminal 205 and second terminal 206, an LE2 input with first terminal 225 and second terminal 226, and an LSB output with first terminal 240 and second terminal 241.

Transistors 210, 211, 212, 213, 216, 217, 218, 219, 220, and 221 form a three level, serial logic adder 270. Transistors 210, 211, 212, and 213 form a first logic level "A" with transistors 210 and 211, and transistors 212 and 213 forming two distinct differential pairs. Transistors 216, 217, 218, and 219 form a second logic level "B" with transistors 216 and 217, and transistors 218 and 219 forming two distinct differential pairs. Transistors 220 and 221 form a third logic level "C" with transistors 220 and 221 forming a differential pair.

Transistors 214 and 215 form latch circuit 272. Transistors 222 and 223 form latch enable circuit 274. Latch enable circuit 274 is used to steer bias current to adder 270 or to latch circuit 272.

Collector terminal of transistor 210, collector terminal of transistor 212, collector terminal of transistor 214, and base terminal of transistor 215 are connected at a first node, and this first node is connected to bias point 230 through resistor 232. This first node is also connected to a first terminal 240 on the LSB output. Collector terminal of transistor 211, collector terminal of transistor 213, collector terminal of transistor 215, and base terminal of transistor 214 are connected at a second node, and this second node is connected to bias point 231 through resistor 233. This second node is also connected to a second terminal 241 on the LSB output.

Base terminal of transistor 210 and base terminal of transistor 213 are connected to a first terminal 201 on the A2 input. Base terminal of transistor 211 and base terminal of transistor 212 are connected a second terminal 202 on the A2 input.

Emitter terminal of transistor 210 and emitter terminal of transistor 211 are connected to collector terminal of transistor 216 and to collector terminal of transistor 218. Emitter terminal of transistor 212 and emitter terminal of transistor 213 are connected to collector terminal of transistor 217 and to collector terminal of transistor 219.

Base terminal of transistor 216 and base terminal of transistor 219 are connected a first terminal 203 on the B2 input. Base terminal of transistor 217 and base terminal of transistor 218 are connected a second terminal 204 on the B2 input.

Emitter terminal of transistor 216 and emitter terminal of transistor 217 are connected to collector terminal of transistor 220. Emitter terminal of transistor 218 and emitter terminal of transistor 219 are connected to collector terminal of transistor 221.

Base terminal of transistor 220 is connected to a first terminal 205 on the C2 input. Base terminal of transistor 221 is connected to a second terminal 206 on the C2 input.

Emitter terminal of transistor 220 and emitter terminal of transistor 221 are connected to collector terminal of transistor 222. Emitter terminal of transistor 214 and emitter terminal of transistor 215 are connected to collector terminal of transistor 223.

Base terminal of transistor 222 is connected to a first terminal 225 on the LE2 input. Base terminal of transistor 223 is connected to a second terminal 226 on the LE2 input. Emitter terminal of transistor 222 and emitter terminal of transistor 223 are connected to bias point 235.

In a preferred embodiment, bias point 235 is connected to ground. In addition, bias point 230 and bias point 231 are connect to a positive supply voltage.

Figure 3:
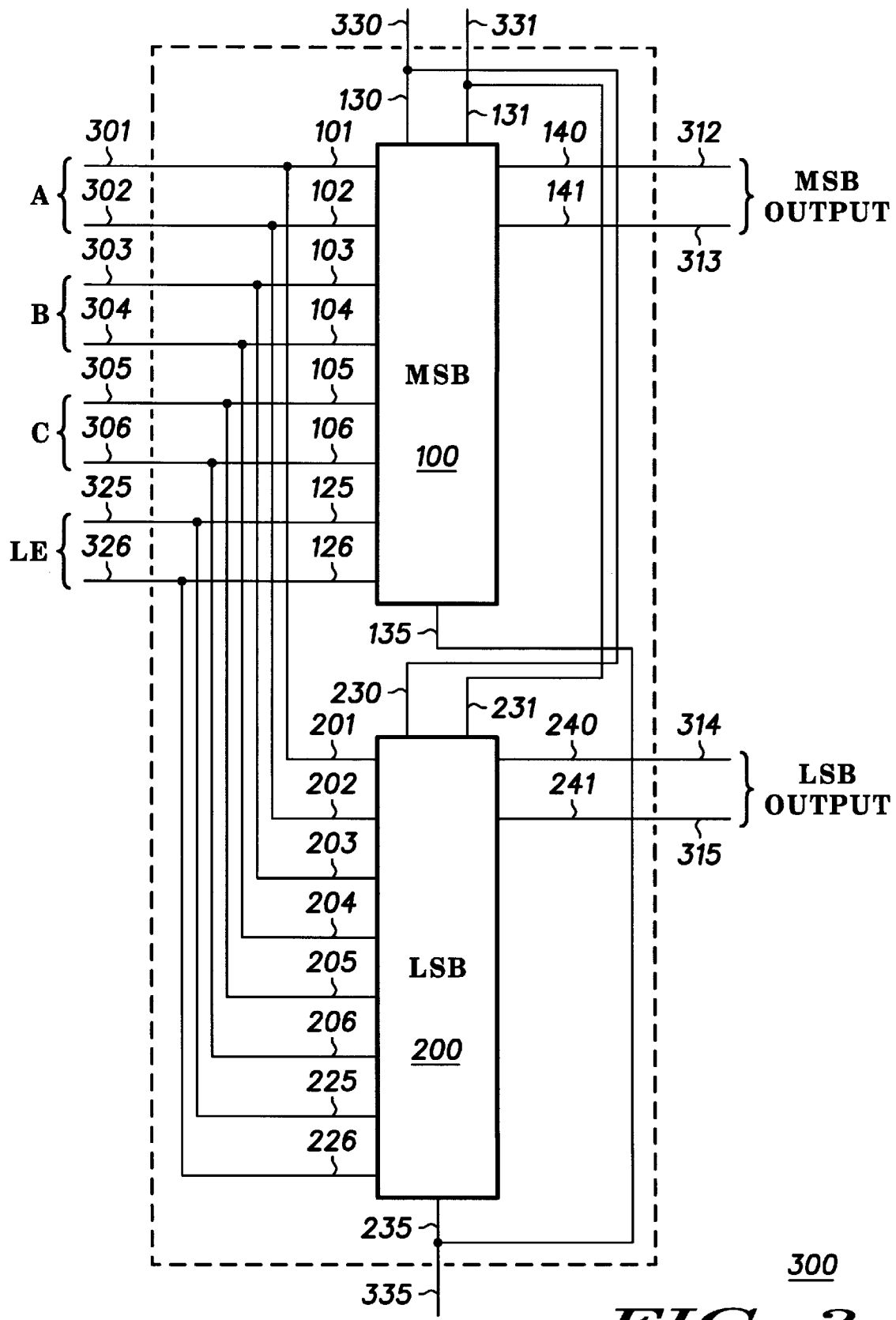
FIG. 3 illustrates a block diagram for a high speed low power latchable 3-2 adder circuit in accordance with a preferred embodiment of the present invention.

FIG. 3 illustrates a simplified block diagram for a high speed low power latchable 3-2 adder circuit in accordance with a preferred embodiment of the present invention. Latchable 3-2 adder circuit 300 comprises MSB adder circuit 100 (FIG. 1) and LSB adder circuit 200 (FIG. 2). Latchable adder circuit 300 includes three differential data inputs and a differential latch input. A first differential data input comprises digital inputs 301 and 302. A second differential data input comprises digital inputs 303 and 304. A third differential data input comprises digital inputs 305 and 306. In addition, latchable 3-2 adder circuit 300 includes two differential data outputs. Also, latchable adder circuit 300 includes three bias inputs 330, 331, and 335.

Digital input 301 is coupled to terminal 101 on MSB adder circuit 100 and to terminal 201 on LSB adder circuit 200. Digital input 302 is coupled terminal 102 on MSB adder circuit 100 and to terminal 202 on LSB adder circuit 200. Digital input 303 is coupled to terminal 103 on MSB adder circuit 100 and to terminal 203 on LSB adder circuit 200. Digital input 304 is coupled terminal 104 on MSB adder circuit 100 and to terminal 204 on LSB adder circuit 200. Digital input 305 is coupled to terminal 105 on MSB adder circuit 100 and to terminal 205 on LSB adder circuit 200. Digital input 306 is coupled to terminal 106 on MSB adder circuit 100 and to terminal 206 on LSB adder circuit 200.

The differential latch enable input comprises latch enable inputs 325 and 326. Latch enable input 325 is coupled to latch enable input terminal 125 on MSB adder circuit 100 and to latch enable input terminal 225 on LSB adder circuit 200. Latch enable input 326 is coupled to latch enable input terminal 126 on MSB adder circuit 100 and to latch enable input terminal 226 on LSB adder circuit 200.

The first differential output comprises outputs 312 and 313. Output 312 is coupled to output terminal 140 on MSB adder circuit 100. Output 313 is coupled to output terminal 141 on MSB adder circuit 100. The second differential output comprises outputs 314 and 315. Output 314 is coupled to output terminal 240 on LSB adder circuit 200. Output 315 is coupled to output terminal 241 on LSB adder circuit 200.

The first bias input 330 is coupled to bias input 130 on MSB adder circuit 100 and to bias input 230 on LSB adder circuit 200. The second bias input 331 is coupled to bias input 131 on MSB adder circuit 100 and to bias input 231 on LSB adder circuit 200. The third bias input 335 is coupled to bias input 135 on MSB adder circuit 100 and to bias input 235 on LSB adder circuit 200.

In one embodiment, first bias input 330 and second bias input 331 are connected to a positive supply voltage, and third bias input 335 is connected to ground. In another embodiment, first bias input 330 and second bias input 331 are connected to ground, and third bias input 335 is connected to a negative supply voltage.

FIG. 4 illustrates a truth table representation for the operation of the 3-2 adder circuit 300 in accordance with a preferred embodiment of the present invention. Truth table 400 comprises input state columns 402, 404, and 406. Truth table 400 also comprises input latch state column 410. In addition, truth table 400 comprises output state columns 420 and 422. Four states are shown in truth table 400, and they are "0", "1", "X" (don't care), and "latched" (fixed).

Column 402 illustrates the input state for the first differential input "A" which includes digital inputs 301 and 302. Column 404 illustrates the input state for the second differential input "B" which includes digital inputs 303 and 304. Column 406 illustrates the input state for the third differential input "C" which includes digital inputs 305 and 306. Column 410 illustrates the input state for the differential latch enable input which includes digital inputs 320 and 321. Column 420 illustrates the output state for the first differential output which includes digital outputs 312 and 313. Column 422 illustrates the output state for the second differential output which includes digital outputs 314 and 315.

Truth table 400 describes the output states at the MSB output (312, 313) and the LSB output (314, 315) for different states on the summation inputs.

The two outputs are in a high state when all the summation inputs are in a high state. Latch enable input "0" cause the outputs to become "latched".

Figure 5:
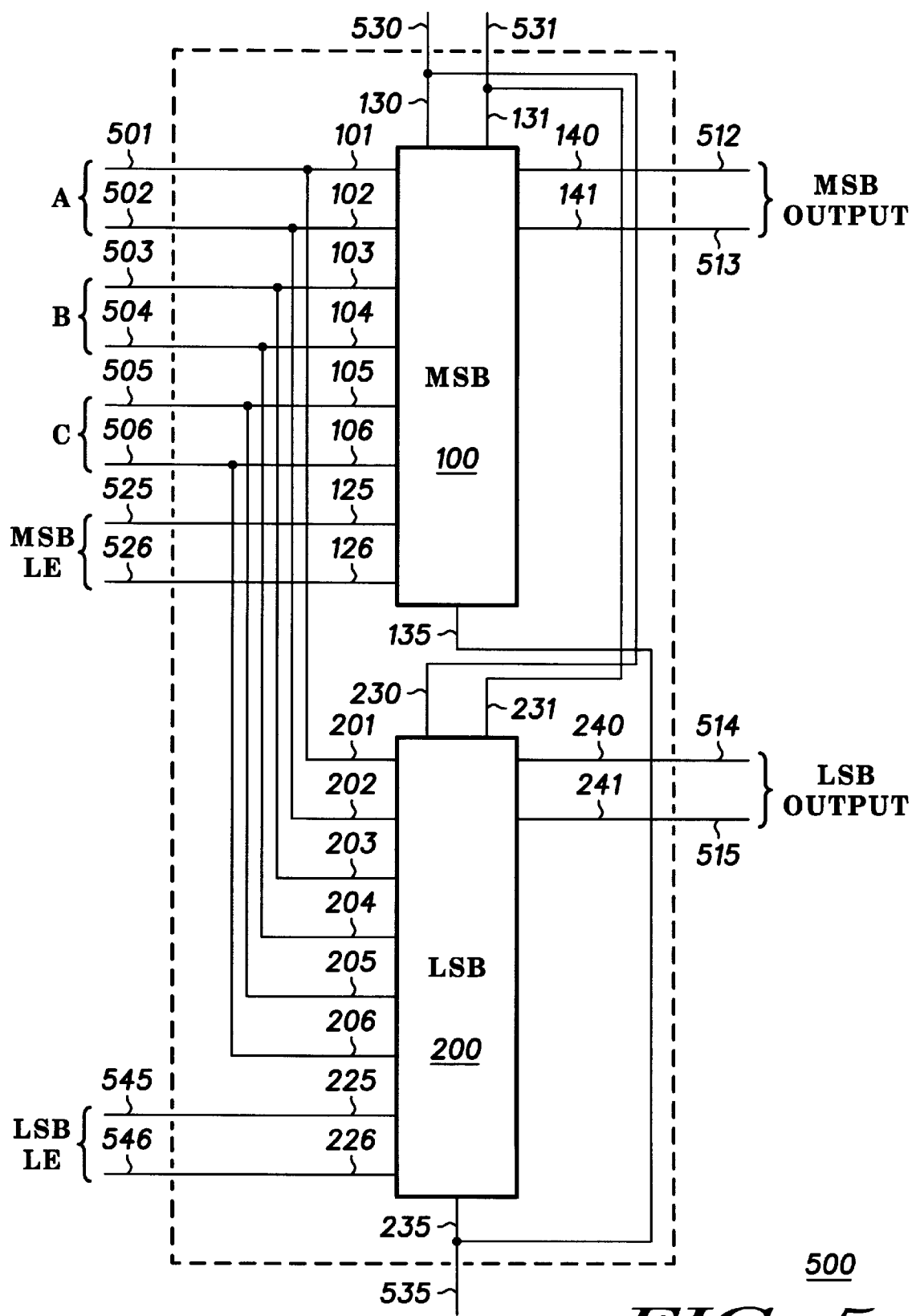
FIG. 5 illustrates a simplified block diagram for a high speed low power latchable 3-2 adder circuit in accordance with an alternate embodiment of the present invention.

FIG. 5 illustrates a simplified block diagram for a high speed low power latchable 3-2 adder circuit 500 in accordance with an alternate embodiment of the present invention. Latchable adder circuit 500 comprises MSB adder circuit 100 (FIG. 1) and LSB adder circuit 200 (FIG. 2). Latchable adder circuit 500 includes three differential data inputs and two differential latch enable inputs. A first differential data input comprises digital inputs 501 and 502. A second differential data input comprises digital inputs 503 and 504. A third differential data input comprises digital inputs 505 and 506. In addition, latchable adder circuit 500 includes two differential data outputs. Also, latchable adder circuit 500 includes three bias inputs 530, 531, and 535.

Digital input 501 is coupled to terminal 101 on MSB adder circuit 100 and to terminal 201 on LSB adder circuit 200. Digital input 502 is coupled to terminal 102 on MSB adder circuit 100 and to terminal 202 on LSB adder circuit 200. Digital input 503 is coupled to terminal 103 on MSB adder circuit 100 and to terminal 203 on LSB adder circuit 200. Digital input 504 is coupled to terminal 104 on MSB adder circuit 100 and to terminal 204 on LSB adder circuit 200. Digital input 505 is coupled to terminal 105 on MSB adder circuit 100 and to terminal 205 on LSB adder circuit 200. Digital input 506 is coupled to terminal 106 on MSB adder circuit 100 and to terminal 206 on LSB adder circuit 200.

The first differential latch enable input comprises latch enable inputs 520 and 521. Latch enable input 525 is coupled to latch enable input terminal 125 on MSB adder circuit 100. Latch enable input 526 is coupled to latch enable input terminal 126 on MSB adder circuit 100. The second differential latch enable input comprises latch enable inputs 522 and 523. Latch enable input 545 is coupled to latch enable input terminal 225 on LSB adder circuit 200. Latch enable input 546 is coupled to latch enable input terminal 226 on LSB adder circuit 200. Separate latch enable inputs are provided to provide enhanced performance in a pipeline architecture.

The first differential output comprises outputs 512 and 513. Output 512 is coupled to output 140 on MSB adder circuit 100. Output 513 is coupled to output 141 on MSB adder circuit 100. The second differential output comprises outputs 514 and 515. Output 514 is coupled to output terminal 240 on LSB adder circuit 200. Output 515 is coupled to output terminal 241 on LSB adder circuit 200.

The first bias input 530 is coupled to bias input 130 on MSB adder circuit 100 and to bias input 230 on LSB adder circuit 200. The second bias input 531 is coupled to bias input 131 on MSB adder circuit 100 and to bias input 231 on LSB adder circuit 200. The third bias input 535 is coupled to bias input 135 on MSB adder circuit 100 and to bias input 235 on LSB adder circuit 200.

In one embodiment, first bias input 530 and second bias input 531 are connected to a positive supply voltage, and third bias input 535 is connected to ground. In another embodiment, first bias input 530 and second bias input 531 are connected to ground, and third bias input 535 is connected to a negative supply voltage.

FIG. 6 illustrates a truth table representation for the operation of the 3-2 adder circuit 500 in accordance with an alternate embodiment of the present invention. Truth table 600 comprises input state columns 602, 604, and 606. Truth table 600 also comprises two latch enable input state columns 610 and 612. In addition, truth table 600 comprises output state columns 620 and 622. Four states are shown in truth table 600, and they are "0", "1", "X" (don't care), and "latched" (fixed).

Column 602 illustrates the input state for the first differential input which includes digital inputs 501 and 502. Column 604 illustrates the input state for the second differential input which includes digital inputs 503 and 504. Column 606 illustrates the input state for the third differential input which includes digital inputs 505 and 506.

Column 610 illustrates the input state for the first (MSB) differential latch enable input which includes digital inputs 525 and 526. Column 612 illustrates the input state for the second (LSB) differential latch enable input which includes digital inputs 545 and 546. Separate latch enable inputs are provided to provide enhanced performance in a pipeline architecture.

Column 620 illustrates the output state for the first differential output which includes digital outputs 512 and 513. Column 622 illustrates the output state for the second differential output which includes digital outputs 514 and 515.

Truth table 600 describes the output states at the MSB output (312, 513) and the LSB output (314, 515) for different states on the summation inputs. The two outputs are in a high state when all the summation inputs are in a high state. LSB latch enable input "0" causes the LSB output to become "latched", and MSB latch enable input "0" causes the MSB output to become "latched".

Figure 7:
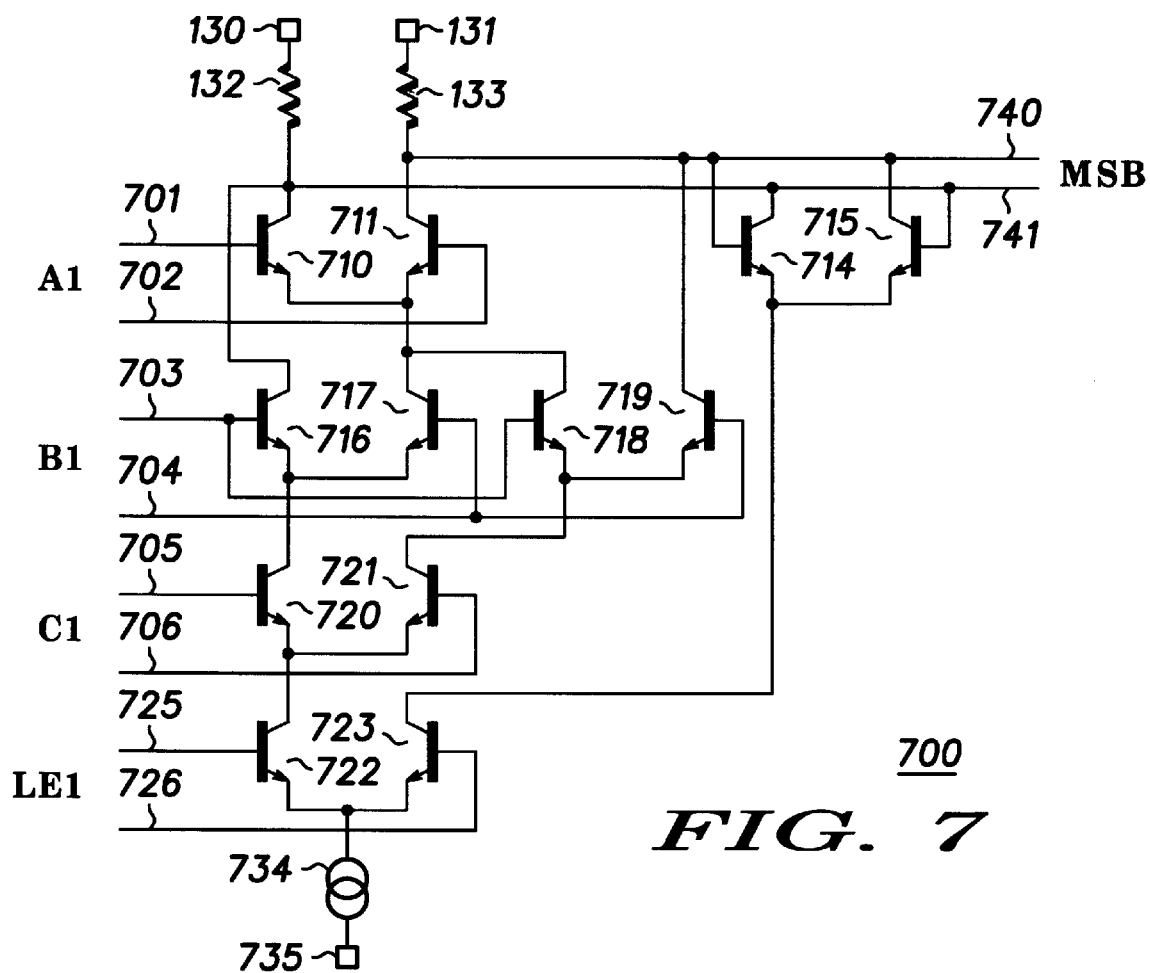
FIG. 7 shows a simplified schematic diagram of an alternate embodiment for an MSB adder in accordance with the present invention.

FIG. 7 shows a simplified schematic diagram of an alternate embodiment for an MSB adder in accordance with the present invention. This embodiment includes fewer transistors. MSB adder 700 includes transistors 710, 711, 714, 715, 716, 717, 718, 719, 720, 721, 722, and 723. MSB adder also includes bias points 730, 731, and 735. MSB adder also includes bias resistor 732, bias resistor 733, and current source 734. In addition, MSB adder includes an A1 input with first terminal 701 and second terminal 702, a B1 input with first terminal 703 and second terminal 704, a C1 input with first terminal 705 and second terminal 706, an LE1 input with first terminal 725 and second terminal 726, and an MSB output with first terminal 740 and second terminal 741.

Transistors 710, 711, 716, 717, 718, 719, 720, and 721 form a three level, serial logic adder. Transistors 710 and 711 form a first logic level "A" with transistors 710 and 711 forming a differential pair. Transistors 716, 717, 718, and 719 form a second logic level "B" with transistors 716 and 717, and transistors 718 and 719 forming two distinct differential pairs. Transistors 720 and 721 form a third logic level "C" with transistors 720 and 721 forming a differential pair.

Transistors 714 and 715 form a latch circuit. Transistors 722 and 723 form a latch enable circuit. The latch enable circuit is used to steer bias current to the adder or to the latch circuit.

Collector terminal of transistor 710, collector terminal of transistor 716, collector terminal of transistor 714, and base terminal of transistor 715 are connected at a first node, and this first node is connected to bias point 730 through resistor 732. This first node is also connected to a first terminal 740 on the MSB output.

Collector terminal of transistor 711, collector terminal of transistor 719, collector terminal of transistor 715, and base terminal of transistor 714 are connected at a second node, and this second node is connected to bias point 731 through resistor 733. This second node is also connected to a second terminal 741 on the MSB output.

Base terminal of transistor 710 is connected to a first terminal 701 on the A1 input. Base terminal of transistor 711 is connected to a second terminal 702 on the A1 input.

Emitter terminal of transistor 710 and emitter terminal of transistor 711 are connected to collector terminal of transistor 717 and to collector terminal of transistor 718.

Base terminal of transistor 716 and base terminal of transistor 718 are connected to a first terminal 703 on the B1 input. Base terminal of transistor 717 and base terminal of transistor 719 are connected to a second terminal 704 on the B1 input.

Emitter terminal of transistor 716 and emitter terminal of transistor 717 are connected to collector terminal of transistor 720. Emitter terminal of transistor 718 and emitter terminal of transistor 719 are connected to collector terminal of transistor 721.

Base terminal of transistor 720 is connected to a first terminal 705 on the C1 input. Base terminal of transistor 721 is to a second terminal 706 on the C1 input.

Emitter terminal of transistor 720 and emitter terminal of transistor 721 are connected to collector terminal of transistor 722. Emitter terminal of transistor 714 and emitter terminal of transistor 715 are connected to collector terminal of transistor 723.

Base terminal of transistor 722 is connected to a first terminal 725 on the LE1 input. Base terminal of transistor 723 is connected to a second terminal 726 on the LE1 input. Emitter terminal of transistor 722 and emitter terminal of transistor 723 are connected to current source 734. Current source 734 is also connected to bias point 735.

In one embodiment, bias point 735 is connected to ground. In addition, bias point 730 and bias point 731 are connect to a positive supply voltage source.

In a preferred embodiment, the latchable adder comprises an adder portion, a latch portion for holding an adder portion output at a fixed state; and a current source for providing a bias current to the adder portion or to the latch portion. In addition, the latchable adder further comprises a latch enable portion which causes the bias current from the current source to be switched between the adder portion and the latch portion.

The latch enable portion has a latch enable input which operates to cause current to be switched from the adder portion to the latch portion. A first input signal at the latch enable input causes the bias current to be provided to the adder portion, and this allows the adder portion output to change state. A second input signal at the latch enable input causes the bias current to be provided to the latch portion, and in this case, the latch portion holds the adder portion output at a fixed state.

In a preferred embodiment, the adder portion, the latch portion, the latch enable portion, and the current source are included in an MSB portion. In this case, the latch enable portion has a latch enable input. In addition, an LSB portion is also included which comprises a second adder portion having a second adder portion output, and a second latch portion. Also, the second latch enable portion has a second latch enable input which causes a second bias current from the current source to be switched between the second adder portion and the second latch portion.

Further, a first input signal at the second latch enable input causes the second bias current to be provided to the second adder portion, and this allows the second adder portion output to change state. A second input signal at the second latch enable input causes the second bias current to be provided to the second latch portion, and this causes the second latch portion to hold the second adder portion output at a fixed state.

In a preferred embodiment, the MSB portion and the LSB portion comprise a latchable 3-2 adder circuit. In the latchable 3-2 adder circuit, three logic signals presented to the three inputs of the latchable 3-2 adder circuit are processed by the MSB portion to provide an MSB output signal at the MSB output of the latchable 3-2 adder circuit. The three logic signals are processed by the LSB portion to provide an LSB output signal at the LSB output on the latchable 3-2 adder circuit.

In addition, the adder portion includes an A1 input, a B1 input, and a C1 input. The second adder portion includes an A2 input, a B2 input, and a C2 input. The latchable 3-2 adder circuit includes an A input coupled to the A1 input and the A2 input, a B input coupled to the B1 input and the B2 input, a C input coupled to the C1 input and the C2 input, an LE input coupled to a latch enable input and a second latch enable input, an MSB output coupled to the adder portion output, and an LSB output coupled to the second adder portion output.

The present invention provides a method of eliminating transistors and increasing the speed of the remaining transistors in a digital integrated circuit. Computer simulations show a 50 to 75% reduction in the transistor count of the system.

In a preferred embodiment, a 66–75% reduction of the power required to implement an adder at a given speed is achieved. In addition, a 50% reduction in the transistor count required to implement the adders is also achieved. The adder circuit uses series logic to combine three levels of logic and one level of latching into a single gate. The combination of circuits reduces transistor count by eliminating non-value adding gates.

The present invention has been described above with reference to a preferred embodiment. However, those skilled in the art will recognize that changes and modifications can be made in this embodiment without departing from the scope of the present invention. For example, while a preferred embodiment has been described in terms of using a specific number of transistors, other circuits can be envisioned which use different numbers of transistors. Accordingly, these and other changes and modifications which are obvious to those skilled in the art are intended to be included within the scope of the present invention.

What is claimed is:

1. A latchable adder comprising:
    an MSB portion comprising:
        an adder portion;
        a latch portion for holding an adder portion output at a fixed state;
        a current source for providing a bias current to said adder portion and to said latch portion;
        a latch enable portion for causing said bias current from said current source to be switched between said adder portion and said latch portion, said latch enable portion having a latch enable input; and
    an LSB portion comprising:
        a second adder portion having a second adder portion output, a second latch portion, and a second latch enable portion having a second latch enable input, said second latch enable portion for causing a second bias current from said current source to be switched between said second adder portion and said second latch portion;
        wherein said adder portion comprises:
            a first transistor, a second transistor, a third transistor, a fourth transistor, a fifth transistor, a sixth transistor, a seventh transistor, an eighth transistor, a ninth transistor, and a tenth transistor, wherein
            a collector terminal of said first transistor, a collector terminal of said fourth transistor, and a collector terminal of said fifth transistor are connected to a first node and a first terminal of said adder portion output;
            a collector terminal of said second transistor, a collector terminal of said third transistor, and a collector terminal of said eighth transistor are connected to a second node and a second terminal of said adder portion output;
            a base terminal of said first transistor and a base terminal of said fourth transistor are connected to a first terminal of an A1 input;
            a base terminal of said second transistor and a base terminal of said third transistor are connected to a second terminal of said A1 input;
            an emitter terminal of said first transistor and an emitter terminal of said second transistor are connected to a collector terminal of said sixth transistor;
            an emitter terminal of said third transistor and an emitter terminal of said fourth transistor are connected to a collector terminal of said seventh transistor;
            a base terminal of said fifth transistor and a base terminal of said seventh transistor are connected to a first terminal of a B1 input;
            a base terminal of said sixth transistor and a base terminal of said eighth transistor are connected to a second terminal of said B1 input;
            an emitter terminal of said fifth transistor and an emitter terminal of said sixth transistor are connected to a collector terminal of said ninth transistor;
            an emitter terminal of said seventh transistor and an emitter terminal of said eighth transistor are connected to a collector terminal of said tenth transistor;
            a base terminal of said ninth transistor is connected to a first terminal of a C1 input;
            a base terminal of said tenth transistor is connected to a second terminal of said C1 input; and
            an emitter terminal of said ninth transistor and an emitter terminal of said tenth transistor are connected to a third node.

2. The latchable adder as claimed in claim 1, wherein said latch enable portion has a latch enable input and wherein a first input signal at said latch enable input causes said bias current to be provided to said adder portion, said latch portion allowing said adder portion output to change state.

3. The latchable adder as claimed in claim 1, wherein said latch enable portion has a latch enable input and wherein a second input signal at said latch enable input causes said bias current to be provided to said latch portion, said latch portion holding said adder portion output at said fixed state.

4. The latchable adder as claimed in claim 1, wherein a first input signal at said second latch enable input causes said second bias current to be provided to said second adder portion, said second latch portion allowing said second adder portion output to change state.

5. The latchable adder as claimed in claim 1, wherein a second input signal at said second latch enable input causes said second bias current to be provided to said second latch portion, said second latch portion holding said second adder portion output at said fixed state.

6. The latchable adder as claimed in claim 1, wherein said MSB portion and said LSB portion comprise a latchable 3-2 adder circuit, wherein
    three logic signals presented to three inputs of said latchable 3-2 adder circuit are processed by said MSB portion to provide an MSB output signal at an MSB output on said latchable 3-2 adder circuit, and said three logic signals are processed by said LSB portion to provide an LSB output signal at an LSB output on said latchable 3-2 adder circuit.

7. The latchable adder as claimed in claim 1, wherein said MSB portion and said LSB portion comprise a latchable 3-2 adder circuit, wherein
said adder portion further comprising an A1 input, a B1 input, and a C1 input,
said second adder portion further comprising an A2 input, a B2 input, and a C2 input,
said latchable 3-2 adder circuit comprising an A input coupled to said A1 input and said A2 input, a B input coupled to said B1 input and said B2 input, a C input coupled to said C1 input and said C2 input, an LE input coupled to said latch enable input and said second latch enable input, an MSB output coupled to said adder portion output, and an LSB output coupled to said second adder portion output.

8. The latchable adder as claimed in claim 1, wherein said latch portion further comprises:
an eleventh transistor and a twelfth transistor, wherein
a base terminal of said eleventh transistor and a collector terminal of said twelfth transistor are connected to said first terminal of said adder portion output;
a base terminal of said twelfth transistor and a collector terminal of said eleventh transistor are connected to said second terminal of said adder portion output; and
an emitter terminal of said eleventh transistor and an emitter terminal of said twelfth transistor are connected to a fourth node.

9. The latchable adder as claimed in claim 8, wherein said latch enable portion further comprises:
a thirteenth transistor and a fourteenth transistor, wherein
a collector terminal of said thirteenth transistor is connected to said third ode;
a collector terminal of said fourteenth transistor is connected to said fourth node;
a base terminal of said thirteenth transistor is connected to a first terminal of an LE1 input;
a base terminal of said fourteenth transistor is connected to a second terminal of said LE1 input; and
an emitter terminal of said thirteenth transistor and an emitter terminal of said fourteenth transistor are connected to said current source.

10. The latchable adder as claimed in claim 9, wherein said first transistor, said second transistor, said third transistor, said fourth transistor, said fifth transistor, said sixth transistor, said seventh transistor, said eighth transistor, said ninth transistor, said tenth transistor, said eleventh transistor, said twelfth transistor, said thirteenth transistor, and said fourteenth transistor are NPN transistors.

11. The latchable adder as claimed in claim 9, wherein said first transistor, said second transistor, said third transistor, said fourth transistor, said fifth transistor, said sixth transistor, said seventh transistor, said eighth transistor, said ninth transistor, said tenth transistor, said eleventh transistor, said twelfth transistor, said thirteenth transistor, and said fourteenth transistor are PNP transistors.

12. The latchable adder as claimed in claim 1, wherein said second adder portion further comprises:
a first transistor, a second transistor, a third transistor, a fourth transistor, a fifth transistor, a sixth transistor, a seventh transistor, an eighth transistor, a ninth transistor, and a tenth transistor, wherein
a collector terminal of said first transistor and a collector terminal of said third transistor are connected to a first node and to a first terminal of said second adder portion output;
a collector terminal of said second transistor and a collector terminal of said fourth transistor are connected to a second node and to a second terminal of said second adder portion output;
a base terminal of said first transistor and a base terminal of said fourth transistor are connected to a first terminal of an A2 input;
a base terminal of said second transistor and a base terminal of said third transistor are connected to a second terminal of said A2 input;
an emitter terminal of said first transistor and an emitter terminal of said second transistor are connected to a collector terminal of said fifth transistor and to a collector terminal of said seventh transistor;
an emitter terminal of said third transistor and an emitter terminal of said fourth transistor are connected to a collector terminal of said sixth transistor and to a collector terminal of said eighth transistor;
a base terminal of said fifth transistor and a base terminal of said eighth transistor are connected to a first terminal of a B2 input;
a base terminal of said sixth transistor and a base terminal of said seventh transistor are connected to a second terminal of said B2 input;
an emitter terminal of said fifth transistor and an emitter terminal of said sixth transistor are connected to a collector terminal of said ninth transistor;
an emitter terminal of said seventh transistor and an emitter terminal of said eighth transistor are connected to a collector terminal of said tenth transistor;
a base terminal of said ninth transistor is connected to a first terminal of a C2 input;
a base terminal of said tenth transistor is connected to a second terminal of said C2 input; and
an emitter terminal of said ninth transistor and an emitter terminal of said tenth transistor are connected to a third node.

13. The latchable adder as claimed in claim 12, wherein said second latch portion further comprises:
an eleventh transistor and a twelfth transistor, wherein
a base terminal of said eleventh transistor and a collector terminal of said twelfth transistor are connected to said first terminal of said adder portion output;
a base terminal of said twelfth transistor and a collector terminal of said eleventh transistor are connected to said second terminal of said adder portion output; and
an emitter terminal of said eleventh transistor and an emitter terminal of said twelfth transistor are connected to a fourth node.

14. The latchable adder as claimed in claim 13, wherein said second latch enable portion further comprises:
a thirteenth transistor and a fourteenth transistor, wherein
a collector terminal of said thirteenth transistor is connected to said third node;
a collector terminal of said fourteenth transistor is connected to said fourth node;
a base terminal of said thirteenth transistor is connected to a first terminal of an LE2 input;
a base terminal of said fourteenth transistor is connected to a second terminal of said LE2 input; and
an emitter terminal of said thirteenth transistor and an emitter terminal of said fourteenth transistor are connected to said current source.

15. The latchable adder as claimed in claim 14, wherein said first transistor, said second transistor, said third transistor, said fourth transistor, said fifth transistor, said sixth transistor, said seventh transistor, said eighth transistor, said ninth transistor, said tenth transistor, said eleventh transistor, said twelfth transistor, said thirteenth transistor, and said fourteenth transistor in said second adder portion are NPN transistors.

16. The latchable adder as claimed in claim 14, wherein said first transistor, said second transistor, said third transistor, said fourth transistor, said fifth transistor, said sixth transistor, said seventh transistor, said eighth transistor, said ninth transistor, said tenth transistor, said eleventh transistor, said twelfth transistor, said thirteenth transistor, and said fourteenth transistor in said second adder portion are PNP transistors.

17. A latchable adder comprising:

a MSB portion comprising:
  an adder portion;
  a latch portion for holding an adder portion output at a fixed state;
  a current source for providing a bias current to said adder portion and to said latch portion;
  a latch enable portion for causing said bias current from said current source to be switched between said adder portion and said latch portion, said latch enable portion having a latch enable input; and an LSB portion comprising:
  a second adder portion having a second adder portion output, and a second latch portion,
  wherein said adder portion comprises:
    a first transistor, a second transistor, a fifth transistor, a sixth transistor, a seventh transistor, an eighth transistor, a ninth transistor, and a tenth transistor, wherein
    a collector terminal of said first transistor and a collector terminal of said fifth transistor are connected to a first node and a first terminal of said adder portion output;
    a collector terminal of said second transistor and a collector terminal of said eighth transistor are connected to a second node and a second terminal of said adder portion output;
    a base terminal of said first transistor is connected to a first terminal of an A1 input;
    a base terminal of said second transistor is connected to a second terminal of said A1 input;
    an emitter terminal of said first transistor and an emitter terminal of said second transistor are connected to a collector terminal of said sixth transistor and to a collector terminal of said seventh transistor;
    a base terminal of said fifth transistor and a base terminal of said seventh transistor are connected to a first terminal of a B1 input;
    a base terminal of said sixth transistor and a base terminal of said eighth transistor are connected to a second terminal of said B1 input;
    an emitter terminal of said fifth transistor and an emitter terminal of said sixth transistor are connected to a collector terminal of said ninth transistor;
    an emitter terminal of said seventh transistor and an emitter terminal of said eighth transistor are connected to a collector terminal of said tenth transistor;
    a base terminal of said ninth transistor is connected to a first terminal of a C1 input;
    a base terminal of said tenth transistor is connected to a second terminal of said C1 input; and
    an emitter terminal of said ninth transistor and an emitter terminal of said tenth transistor are connected to a third node.

18. A method for operating a latchable adder, wherein said latchable adder includes an adder portion, a latch portion, and a current source, said method comprising the steps of:
  allowing a first bias current to be provided from said current source to said adder portion and not allowing a second bias current to be provided from said current source to said latch portion when said latchable adder is operated in a first state; and
  allowing said second bias current to be provided from said current source to said latch portion and not allowing said first bias current to be provided from said current source to said adder portion when said latchable adder is operated in a second state.

19. A method for operating a latchable adder, wherein said latchable adder includes an adder portion having an adder portion output, a latch portion, a latch enable portion having a latch enable input, and a current source, said method comprising the steps of:
  providing a first input signal at said latch enable input, said first input signal causing a first bias current to be provided from said current source to said adder portion and not allowing a second bias current to be provided from said current source to said latch portion; and
  providing a second input signal at said latch enable input, said second input signal causing said second bias current to be provided from said current source to said latch portion and not allowing said first bias current to be provided from said current source to said adder portion.

20. The method as claimed in claim 19, said method further comprising the step of:
  allowing said adder portion output to change state when said first input signal is provided, said adder portion output changing state in response to changes on adder portion inputs.

21. The method as claimed in claim 19, said method further comprising the step of:
  holding said adder portion output at a fixed state when said second input signal is provided.

* * * * *

UNITED STATES PATENT AND TRADEMARK OFFICE
CERTIFICATE OF CORRECTION

PATENT NO.: 5,990,703

DATE: November 23, 1999

INVENTOR(S): Richard Steven Griph

It is certified that error appears in the above-identified patent and that said Letters Patent are hereby corrected as shown below:

In claim 9, column 11, line 30, "ode" should be --node--.

Signed and Sealed this

Seventeenth Day of April, 2001

Attest:

NICHOLAS P. GODICI

Attesting Officer     Acting Director of the United States Patent and Trademark Office